United States Patent
Eubelen et al.

(10) Patent No.: US 12,247,433 B2
(45) Date of Patent: Mar. 11, 2025

(54) INFRARED CURTAIN SYSTEMS AND METHODS

(71) Applicant: BEA Inc., Pittsburgh, PA (US)

(72) Inventors: Emmanuel Eubelen, Dalhem (BE); Joseph M. Mulcahy, Beaver Falls, PA (US); Adrien Van Damme, Dalhem (BE); Tom Yantek, Lawrence, PA (US); Andrew P. Bauer, Coraopolis, PA (US)

(73) Assignee: BEA Inc., Pittsburgh, PA (US)

( * ) Notice: Subject to any disclaimer, the term of this patent is extended or adjusted under 35 U.S.C. 154(b) by 106 days.

(21) Appl. No.: 18/045,856

(22) Filed: Oct. 12, 2022

(65) Prior Publication Data

US 2023/0123553 A1 Apr. 20, 2023

Related U.S. Application Data

(60) Provisional application No. 63/262,526, filed on Oct. 14, 2021, provisional application No. 63/262,528, (Continued)

(51) Int. Cl.
*E05F 15/74* (2015.01)
*G01V 8/20* (2006.01)
*E05F 15/43* (2015.01)

(52) U.S. Cl.
CPC ............. *E05F 15/74* (2015.01); *G01V 8/20* (2013.01); *E05F 2015/435* (2015.01)

(58) Field of Classification Search
CPC ....... E05F 15/74; E05F 2015/435; G01V 8/20
See application file for complete search history.

(56) References Cited

U.S. PATENT DOCUMENTS 4,698,937 A * 10/1987 Kornbrekke ............ E05F 15/73
 250/221
4,967,083 A * 10/1990 Kornbrekke ............ G01S 17/50
 250/221

(Continued)

FOREIGN PATENT DOCUMENTS

EP 2843173 8/2020
JP 2003003750 A 1/2003

(Continued)

OTHER PUBLICATIONS

Extended European Search Report for Application No. 22201210.6, dated Feb. 21, 2023, 6 Pages.

(Continued)

*Primary Examiner* — Hugh Maupin
(74) *Attorney, Agent, or Firm* — DLA PIPER LLP (US)

(57) ABSTRACT

An infrared (IR) sensor for use in a door sensor. The IR sensor may include a plurality of emitters arranged in multiple rows. Each emitter of the plurality of emitters may be configured to emit an emission beam comprising IR light. A plurality of receptors may be arranged in multiple rows. Each receptor of the plurality of receptors may be configured to receive a reception beam comprising the IR light reflected off of a surface. One or more lenses comprising refractive elements may be configured to duplicate and direct one or more of the emission beams and one or more of the reception beams onto the surface to form an IR pattern. The IR pattern may include multiple IR curtains. One or more of the receptors and/or emitters may be deactivated to change a width of the IR pattern and/or number of IR curtains.

20 Claims, 14 Drawing Sheets

Related U.S. Application Data filed on Oct. 14, 2021, provisional application No. 63/262,530, filed on Oct. 14, 2021.

(56) References Cited

U.S. PATENT DOCUMENTS

| | | | |
|---|---|---|---|
| 5,142,152 A | | 8/1992 | Boiucaner |
| 5,311,024 A | * | 5/1994 | Marman ............... G08B 13/193 |
| | | | 250/353 |
| 6,114,956 A | * | 9/2000 | Van Genechten ...... G01S 13/56 |
| | | | 340/552 |
| 6,919,567 B2 | | 7/2005 | Iwasawa |
| 7,762,022 B2 | | 7/2010 | Stadler et al. |
| 8,431,899 B2 | | 4/2013 | Tatsuoka |
| 10,487,565 B2 | | 11/2019 | Agam et al. |
| 11,168,508 B2 | | 11/2021 | Dreyer |
| 11,988,033 B2 | | 5/2024 | Eubelen et al. |
| 2004/0094717 A1 | * | 5/2004 | Griffin ................. G08B 13/191 |
| | | | 250/349 |
| 2006/0162254 A1 | | 7/2006 | Imai et al. |
| 2006/0187037 A1 | * | 8/2006 | Eubelen ................. E05F 15/43 |
| | | | 340/552 |
| 2008/0304039 A1 | | 12/2008 | De Coi |
| 2010/0321676 A1 | | 12/2010 | Sasaki et al. |
| 2015/0315834 A1 | * | 11/2015 | Collins .................. E05F 15/40 |
| | | | 49/506 |
| 2019/0360256 A1 | * | 11/2019 | Sasaki ..................... E05F 15/73 |
| 2020/0071133 A1 | | 3/2020 | Kelly |
| 2021/0070587 A1 | * | 3/2021 | Blaiotta .................. B66B 13/22 |
| 2021/0112647 A1 | * | 4/2021 | Coleman ................ H05B 45/12 |
| 2022/0228420 A1 | * | 7/2022 | Gregoriou ............... E05F 15/74 |

FOREIGN PATENT DOCUMENTS

| | | |
|---|---|---|
| JP | 5651837 | 1/2015 |
| JP | 2015017990 A | 1/2015 |
| JP | 2019035231 A | 3/2019 |

OTHER PUBLICATIONS

Office Action for Belgium Patent Application No. 20225823, mailed Jul. 18, 2023, 10 pages.

Office Action for Belgium Patent Application No. 20225821, mailed Jul. 18, 2023, 10 pages.

Office Action for Belgium Patent Application No. 20225822, mailed Jul. 18, 2023, 10 pages.

Office Action for European Patent Application No. 22201210.6, mailed Sep. 5, 2024, 6 pages.

Office Action for European Patent Application No. 22201211.4, mailed Sep. 5, 2024, 5 pages.

Office Action for European Patent Application No. 22201215.5, mailed Sep. 5, 2024, 6 pages.

* cited by examiner

INFRARED CURTAIN SYSTEMS AND METHODS

CROSS REFERENCE TO RELATED APPLICATIONS

This application claims benefit to U.S. Provisional Application No. 63/262,526 entitled "Infrared Curtain Systems and Methods" filed Oct. 14, 2021, U.S. Provisional Application No. 63/262,528 entitled "Moveable Infrared Curtain" filed Oct. 14, 2021, and U.S. Provisional Application No. 63/262,530 entitled "Methods and Systems for Infrared Synchronization" filed Oct. 14, 2021, and is related to U.S. Patent Application No. 18/045,908 entitled "Moveable Infrared Curtain" and U.S. Patent Application No. 18/045,863 entitled "Methods and Systems for Infrared Synchronization," each filed on the same date herewith. The full disclosures of these applications are incorporated herein by reference.

TECHNICAL FIELD

The present disclosure generally relates to sensor devices, and more particularly to a sensor device especially applicable for use in opening and closing automatic doors by sensing for the presence of an object, such as a person, within a predetermined area.

BACKGROUND

Motion sensors are commonly utilized to detect presence and motion within a surveillance area. Such sensors may be used in a variety of applications, including door sensor devices particularly adapted to detect a presence of an object near a passageway or an access point. In such applications, presence and/or motion are detected when an object, such as a person, enters a detection area of the sensor. Upon detection, the motion sensor triggers the opening or closing of a locking mechanism to control access to the passageway.

Applications in which infrared (IR) sensors are used to detect the entry of persons into areas are conventionally known. There are two types of IR sensors, active IR sensors and passive IR sensors. Passive IR sensors measure the intensity of a signal emitted by an object to detect motion. Active IR sensors emit infrared light and analyze the intensity of a reflected signal. When there is a change in intensity of the reflected signal, detection of an object/person is triggered. Active IR sensors are typically used for safety applications.

SUMMARY

Methods, systems, and apparati for use in a door sensor are described herein. In some embodiments, the door sensor may include an IR sensor. The IR sensor may include a plurality of emitters arranged in multiple rows. Each emitter of the plurality of emitters may be configured to emit an emission beam comprising IR light. A plurality of receptors may be arranged in multiple rows. Each receptor of the plurality of receptors may be configured to receive a reception beam comprising the IR light reflected off of a surface. One or more lenses comprising refractive elements may be configured to duplicate and direct one or more of the emission beams and one or more of the reception beams onto the surface to form an IR pattern. In an example, the IR pattern may include multiple IR curtains. One or more of the receptors and/or emitters may be deactivated to change a width of the IR pattern and/or number of IR curtains. The IR sensor may include, for example, a total number of 16-32 receptors and 32-64 emitters. The one or more lenses may duplicate and direct/focus emitted beams of two emitters onto a reception beam of one receptor. The IR pattern may include three rows, each with of 32 detection spots. One or more of the receptors and/or one or more of the emitters may be deactivated to change the shape of the IR pattern.

A method for use in the IR sensor may include emitting, by one or more emitters, one or more emission beams comprising IR light. The one or more emitters may be arranged in multiple rows. One or more receptors may receive one or more reception beams comprising the IR light reflected off of a surface. The one or more receptors may be arranged in multiple rows. Refractive elements of one or more lenses may duplicate and direct the one or more emission beams and the one or more reception beams onto the surface to form an IR pattern. In an example, the IR pattern may include multiple IR curtains. The method may include deactivating one or more of the one or more emitters and the one or more receptors to change one or more of a width of the IR pattern on the surface and a number of the IR curtains. The method may also include adjusting one or more of the one or more receptors and the one or more emitters to change an angle of the IR pattern on the surface.

BRIEF DESCRIPTION OF THE DRAWINGS

The drawings described below are for illustration purposes only. The drawings are not intended to limit the scope of the present disclosure.

DETAILED DESCRIPTION

A number of automatic door systems employ one or more of radar sensors and infrared sensors which sense the traffic approaching the doorway by sensing a Doppler shift and/or changes in received radiation. The radar sensors sense movement in an area surrounding the automatic door and the infrared sensors sense traffic for initiating the door opening/closing sequence. Infrared transmitters have also been used for generating safety beams for insuring that the door does not inadvertently open or close.

The use of microwave and infrared radiation for sensing traffic in connection with automatic door systems is subject to a number of design and operational constraints. For example, the moveable door which traverses through a portion of the traffic path presents a potential for interference with the detection system and must be taken into account in the system design or otherwise compensated for by the detection processing system. The transmitters and detectors may be positioned so as to cover a sufficiently wide area of the traffic path while also minimizing interference from the moving door. Accordingly, relatively complex transmitter and detector beam paths and/or specially designed photoemitter and photodetector lens configurations are incorporated into many infrared sensor systems. The safety beam infrared sensor applications frequently do not provide a large region of coverage. Many such systems also require the separate installation of several units.

Accordingly, a new and improved IR sensor for sensing the presence of traffic in the vicinity of the door threshold is desirable. The new and improved IR sensor may operate in a highly energy efficient manner, may be less susceptible to noise or interference than conventional sensors, and may provide increased flexibility in size and/or shape of the area of detection, as well as an intelligent manner of adjustments of the curtain during opening and closing of the automatic door.

Figure 1:
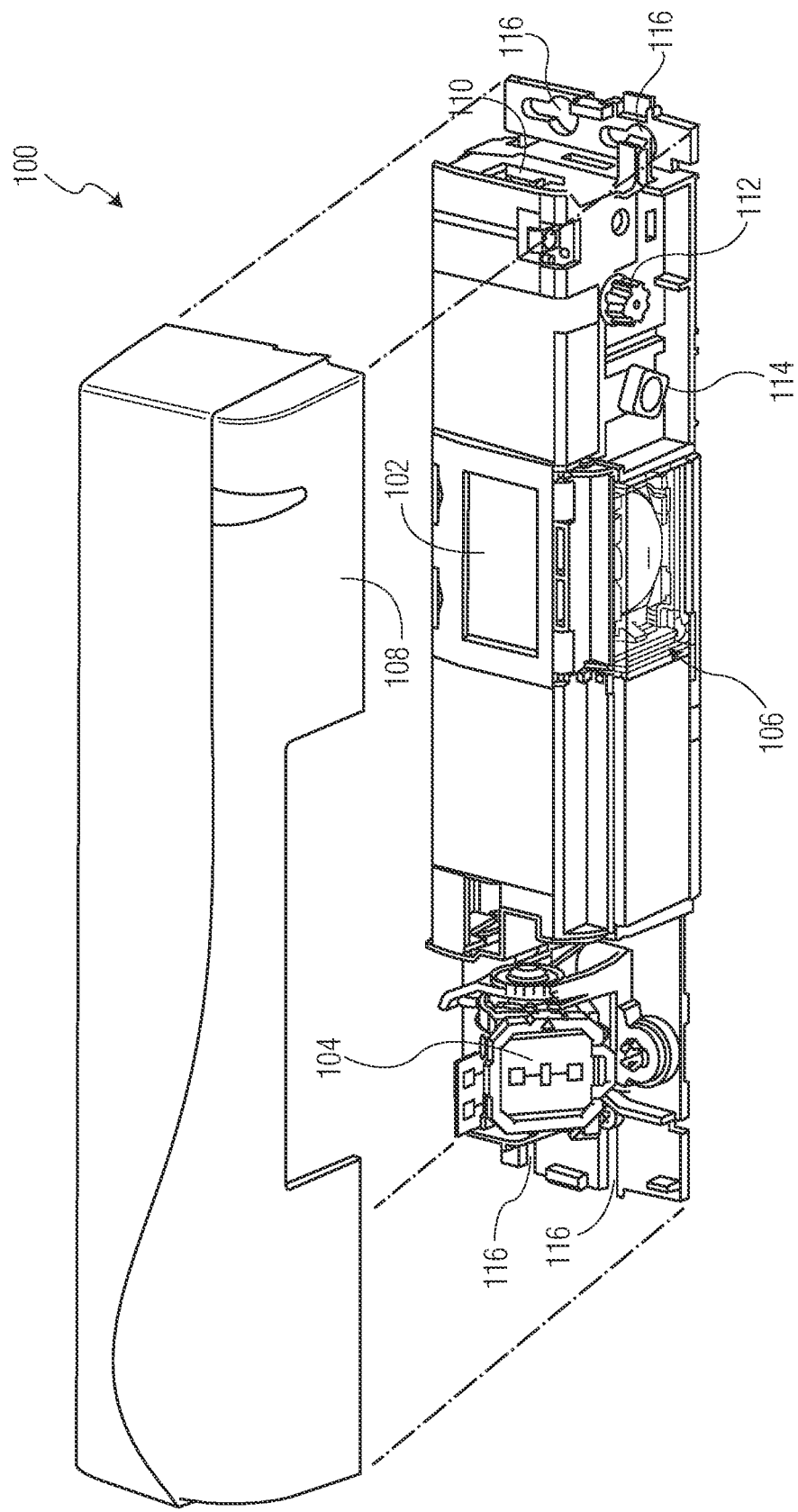
FIG. 1 is a three-dimensional (3D) perspective view of a door sensor incorporating a novel infrared (IR) sensor, according some embodiments of the present disclosure.

Referring now to FIG. 1, a three-dimensional (3D) perspective view of a door sensor 100 incorporating a novel IR sensor 106 is shown. In an example, the door sensor 100 may include a screen 102, a radar antenna 104, the IR sensor 106, a cover 108, a connector 110, a main adjustment knob 112, an angle adjustment knob 114, and one or more attachment points 116 for mounting the door sensor 100 above a door.

In an example, the screen 102 may be a liquid crystal diode (LCD) display and may be either color or monochrome. The radar antenna 104 may be a single component or may be multiple components and may include one or more of a narrow field and a wide field transmitter/receiver. The radar antenna 104 may utilize microwave Doppler radar to detect the presence of motion in a predetermined area. The radar antenna 104 may include a transmitter that operates at, for example, 24.150 GHz. The cover 108 may be a detachable lid made of one or more of plastic, metal, composite, etc. that covers the components of the door sensor 100 and protects them from external forces (e.g., weather, water, impact, etc.) while allowing the IR sensor 106 to remain uncovered. The connector 110 may be an interface (e.g., wired or wireless) that provides one or more of power and data communications.

The main adjustment knob 112 and the angle adjustment knob 114 may be one or more of a dial, button, switch, touch sensitive panel, etc. that is configured to receive user input. As described in detail below, the main adjustment knob 112 may be used to adjust a width and/or shape of a radar field generated by the radar antenna 104. The main adjustment knob 112 may also be used to adjust a number of one or more IR curtains generated by the IR sensor 106 along with a width and/or shape of the one or more IR curtains. The angle adjustment knob 114 may be used to adjust an angle of transmission of the one or more IR curtains generated by the IR sensor 106. In an example, the main adjustment knob 112 may also be used to control one or more rows of visible spots generated by one or more light emitting diodes (LEDs) to assist in setting the width and/or shape and angle of the one or more IR curtains. The one or more LEDs may be located on the IR sensor 106. The components and function of the IR sensor 106 are described in detail herein.

Figure 2:
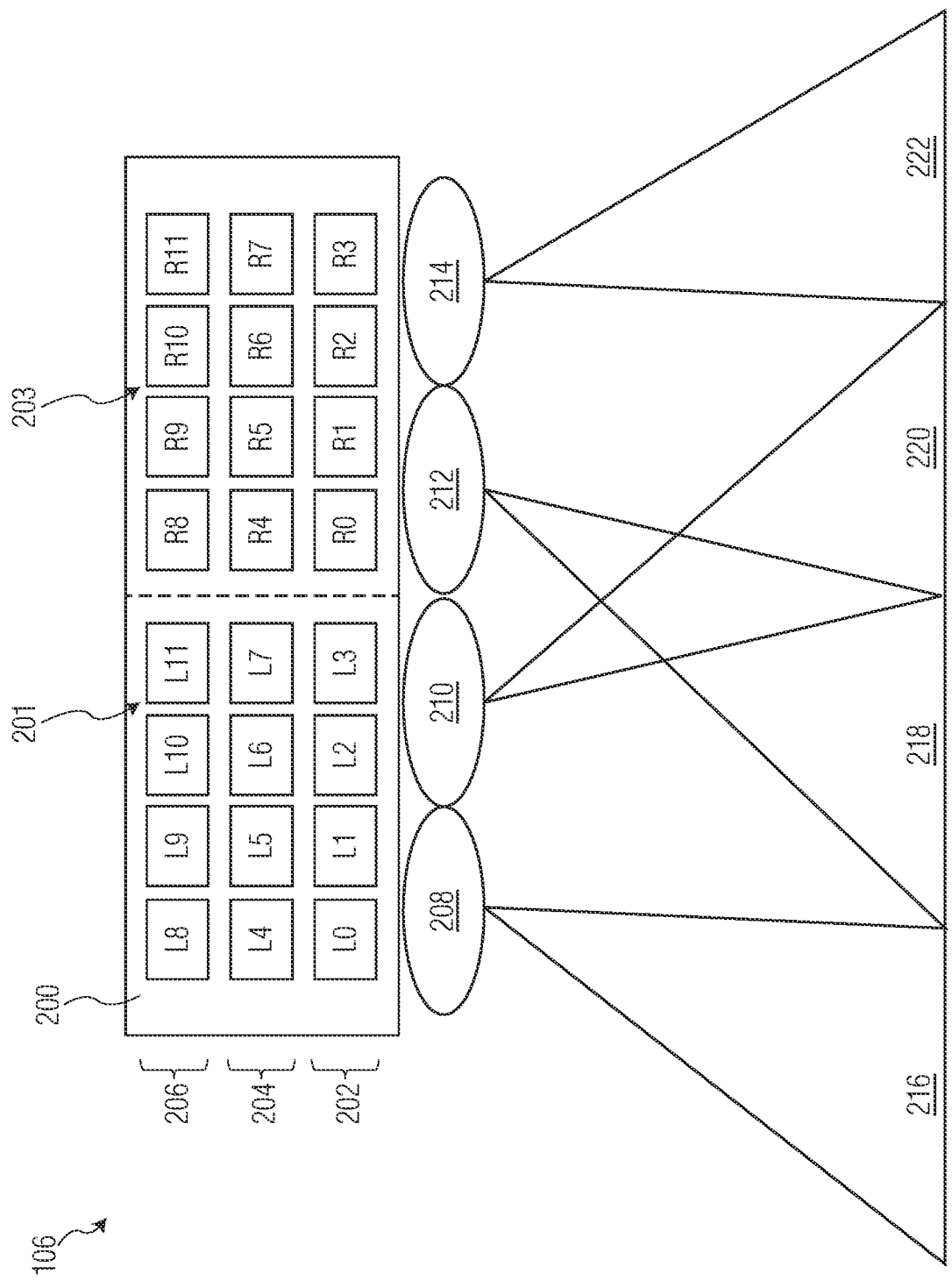
FIG. 2 is a diagram illustrating a receptor array of the IR sensor, according some embodiments of the present disclosure.

Referring now to FIG. 2, a diagram illustrating a receptor array 200 of the IR sensor 106 is shown. The receptor array 200 may include one or more rows of individual receptors. In an example, the receptors may be photodiodes that receive, for example, reflected IR light.

The receptor array may include any number of receptors (e.g., 16-32). In an example, the receptor array 200 may include a total of 24 receptors, shown in FIG. 2 as receptors L0-R11, arranged in one or more rows. A first row 202 may include receptors L0-L3 on a left hand side 201 of the receptor array 200 and receptors R0-R3 on a right hand side 203 of the receptor array 200. A second row 204 may include receptors L4-L7 on the left hand side 201 and receptors R4-R7 on the right hand side 203. A third row 206 may include receptors L8-L11 on the left hand side 201 and receptors R8-R11 on the right hand side 203. It should be noted that the receptor array 200 may include any number of individual receptors in any number of rows, depending on the desired pattern of the IR sensor 106.

Conventional IR sensors may not be able to control individual receptors. For example, field size may be adjusted by physical masking at least a portion of the conventional IR sensor. In contrast, each of the receptors L0-R11 of the IR sensor 106 may be controlled individually. For example, each of the receptors L0-R11 may be activated and deactivated.

In an example, the activation and deactivation of the receptors L0-R11 may be accomplished by actually turning individual receptors L0-R11 on and off via a controller. When turned on, the individual receptors L0-R11 may be configured to receive a reception beam comprising reflected IR light and transmit a signal to the controller. When turned off, the individual receptors L0-R11 may be configured to not receive the reception beam.

In another example, the activation and deactivation of the receptors L0-R11 may a function of software stored in a memory and executed by the controller. The individual receptors L0-R11 may all remain active. The receptors L0-R11 may receive the reception beam and transit signals to the controller. The controller may "deactivate" one or more of the receptors L0-R11 by disregarding/ignoring certain received signals in its processing. For example, the controller may "activate" receptor L0 by processing signals received by the receptor. The controller may "deactivate" receptor L0 by ignoring/disregarding signals received by the receptor.

The receptor array 200 may include (or may be adjacent to) one or more lenses that include refractive elements that duplicate and direct/focus the reception beam of each of the receptors L0-R11 within a particular area of a surface (e.g. a floor). In an example, a first lens 208 may direct/focus receptors L0-L3 from the first row 202, receptors L4-L7 from the second row 204, and receptors L8-L11 from the third row 206 within a first area 216.

A second lens 210 may duplicate and direct/focus receptors L0-L3 from the first row 202, receptors L4-L7 from the second row 204, and receptors L8-L11 from the third row 206 within a third area 220. The third area 220 may be adjacent to a second area 218, which is in turn, adjacent to the first area 216. A third lens 212 may direct/focus receptors R0-R3 from the first row 202, receptors R4-R7 from the second row 204, and receptors R8-R11 from the third row 206 within the second area 218. A fourth lens 214 may duplicate and direct/focus receptors R0-R3 from the first row 202, receptors R4-R7 from the second row 204, and receptors R8-R11 from the third row 206 within a fourth area 222. The fourth area 222 may be adjacent to the third area 220. It should be noted that the arrangement shown in FIG. 2 is provided as an example. The first lens 208, second lens 210, third lens 212, and fourth lens 214 may direct/focus the receptors in any arrangement, including other asymmetric arrangements.

Figure 3:
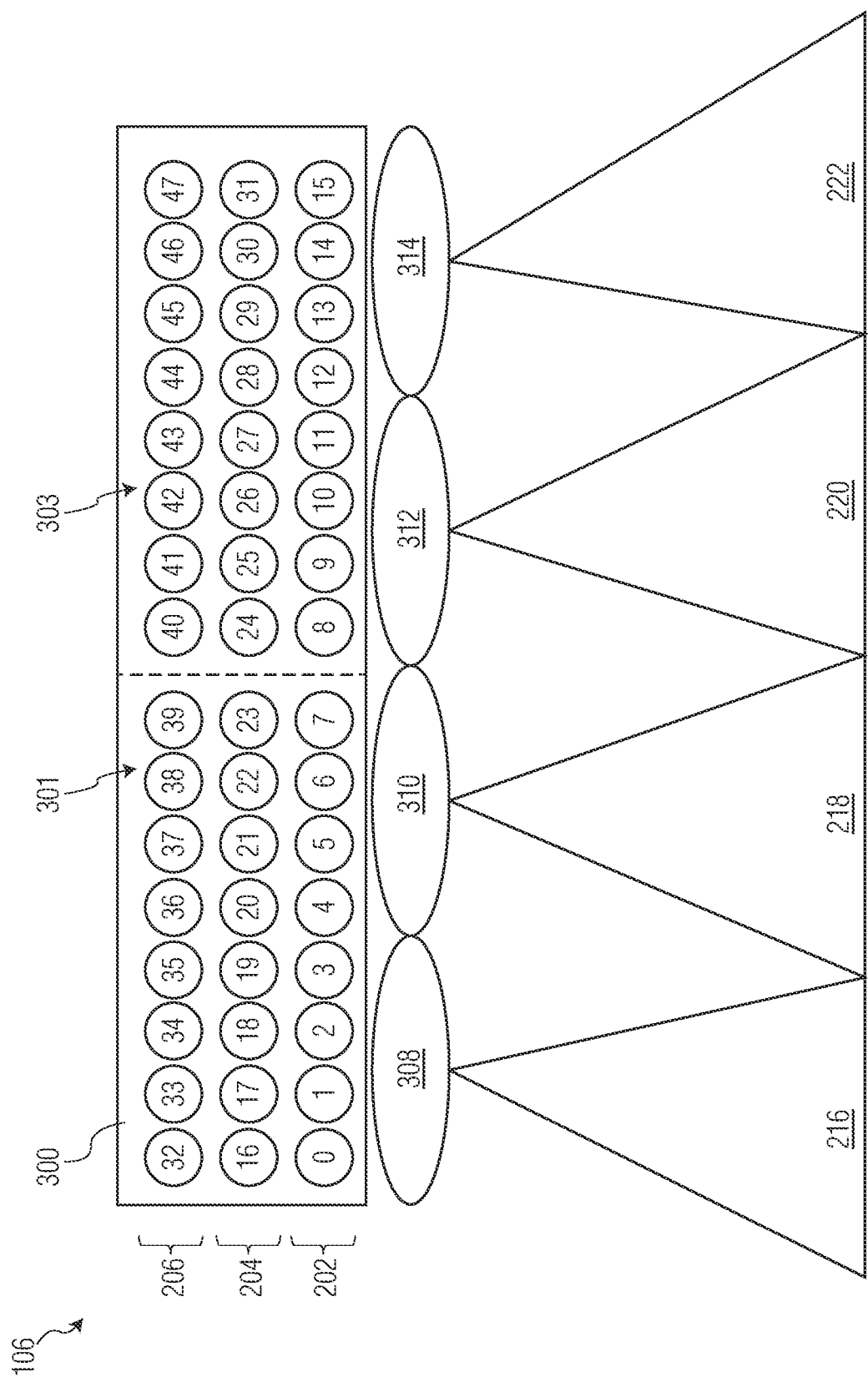
FIG. 3 is a diagram illustrating an emitter array of the IR sensor, according some embodiments of the present disclosure.

Referring now to FIG. 3, a diagram illustrating an emitter array 300 of the IR sensor 106 is shown. The emitter array 300 may include one or more rows of individual emitters. In an example, the emitters may be IR diodes that emit IR light. In an example, the receptor array 200 and the emitter array 300 may be part of the same component within the IR sensor 106. In another example, the receptor array 200 and the emitter array 300 may be separate components.

The emitter array may include any number of emitters (e.g., 32-64). In an example, the emitter array 300 may include a total of 48 emitters, shown in FIG. 3 as emitters 0-47, arranged in one or more rows. A first row 302 may include receptors 0-7 on a left hand side 301 of the emitter array 300 and receptors 8-15 on a right hand side 303 of the emitter array 300. A second row 304 may include emitters 16-23 on the left hand side 301 and emitters 24-31 on the right hand side 303. A third row 306 may include emitters 32-39 on the left hand side 301 and emitters 40-47 on the right hand side 303. It should be noted that the emitter array 300 may include any number of individual emitters in any number of rows, depending on the desired pattern of the IR sensor 106.

The emitter array 300 may include (or may be adjacent to) one or more lenses that duplicate and direct/focus an emission point of each of the emitters 0-47 within a particular area of the surface. In an example, a first lens 308 may direct/focus emitters 0-7 from the first row 302, emitters 16-23 from the second row 304, and emitters 32-39 from the third row 306 within the first area 216. A second lens 310 may duplicate and direct/focus emitters 0-7 from the first row 302, emitters 16-23 from the second row 304, and emitters 32-39 from the third row 306 within the second area 218.

A third lens 312 may direct/focus emitters 8-15 from the first row 302, emitters 24-31 from the second row 304, and emitters 40-17 from the third row 306 within the third area 220. A fourth lens 314 may duplicate and direct/focus 8-15 from the first row 302, emitters 24-31 from the second row 304, and emitters 40-17 from the third row 306 within the fourth area 222. In an example, the first lens 308, the second lens 310, the third lens 312, and the fourth lens 314 may be the same as the first lens 208, the second lens 210, the third lens 212, and the fourth lens 214 respectively. In other example, the lenses may be different. It should be noted that the arrangement shown in FIG. 3 is provided as an example. The first lens 308, second lens 310, third lens 312, and fourth lens 314 may direct/focus the emitters in any arrangement, including asymmetric arrangements. In an example, the pattern of the receiver array 200 may be different than the pattern of the emitter array 300.

Figure 4:
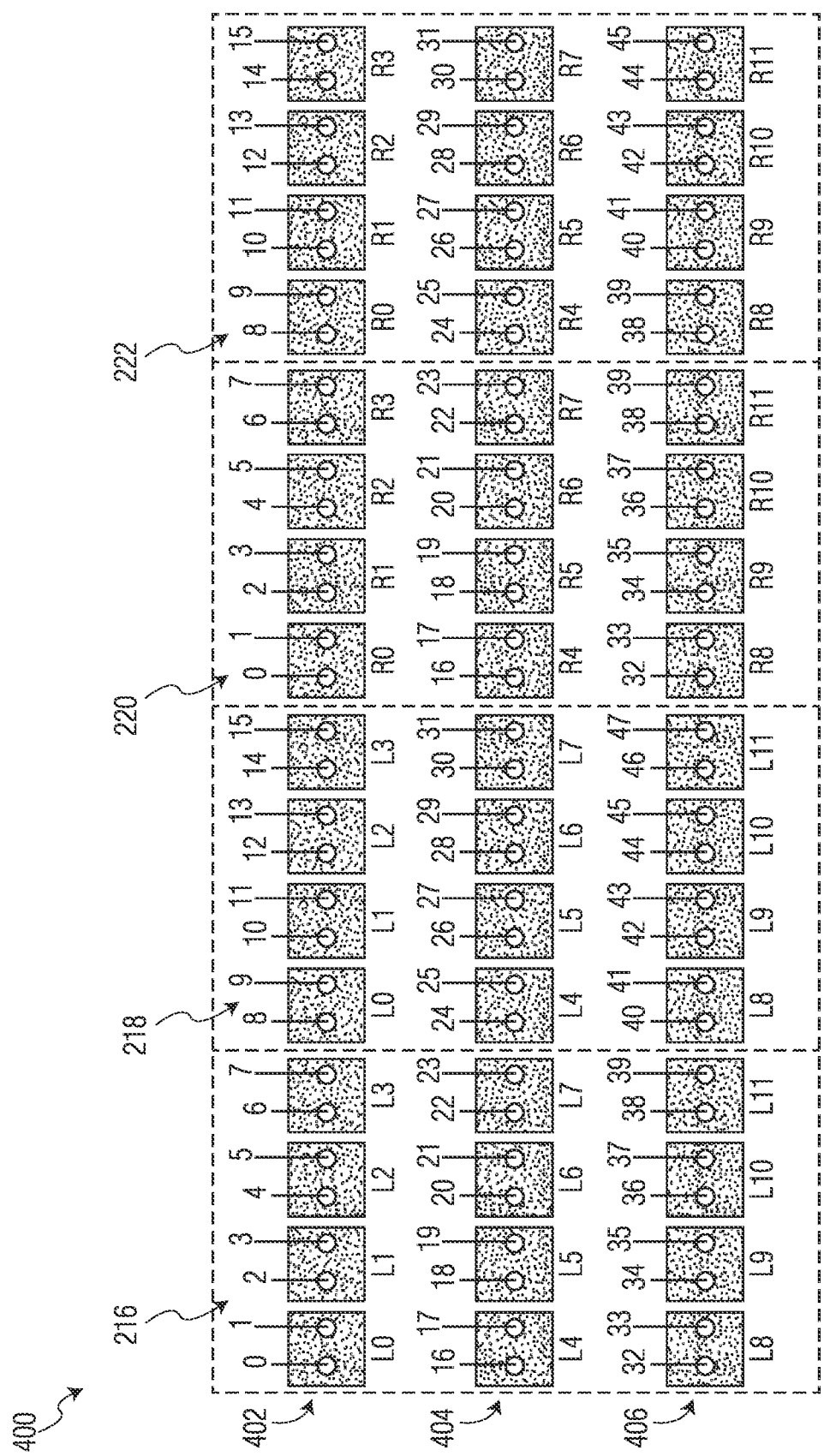
FIG. 4 is a diagram illustrating an IR pattern formed by the IR sensor, according some embodiments of the present disclosure.
Figure 5A:
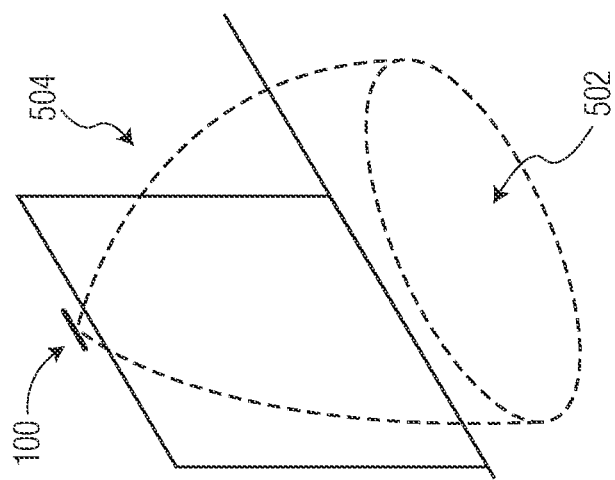
FIGS. 5A-5I are diagrams illustrating adjusting a width of a radar area, according some embodiments of the present disclosure.
Figure 5B:
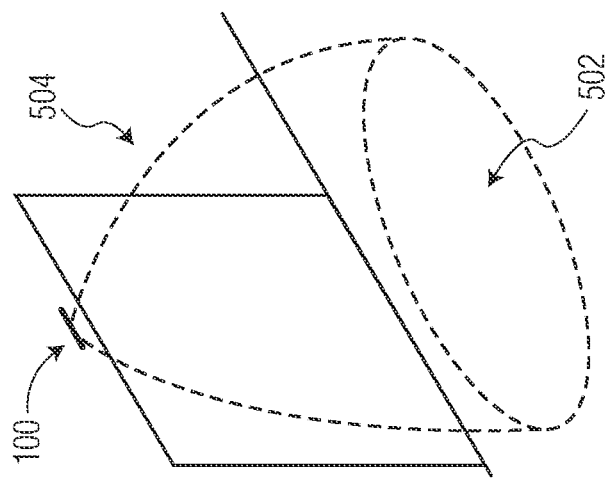
Figure 5C:
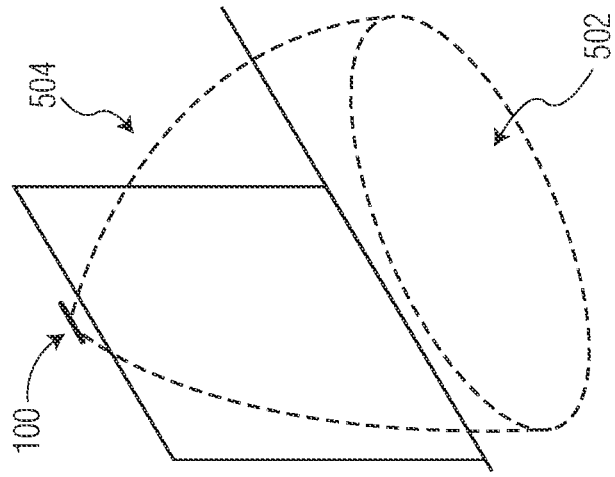
Figure 5D:
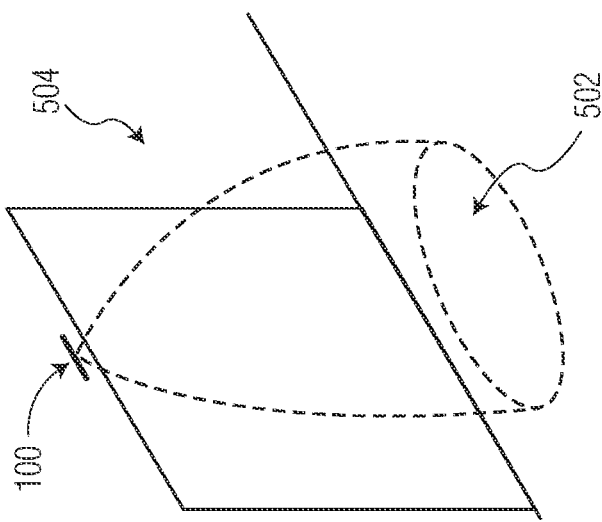
Figure 5E:
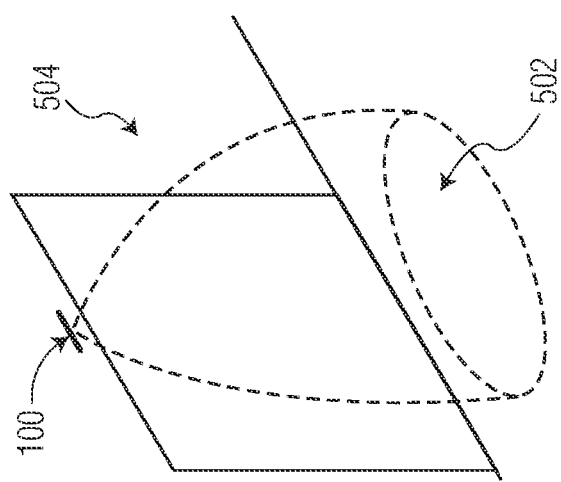
Figure 5F:
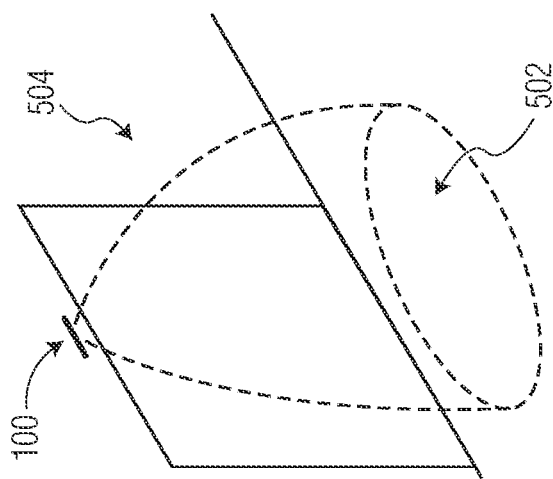
Figure 5G:
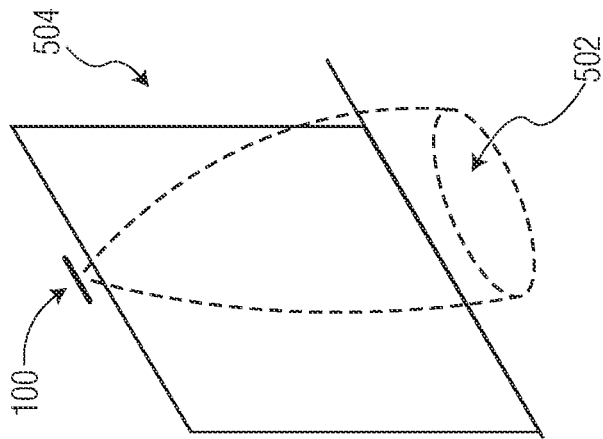
Figure 5H:
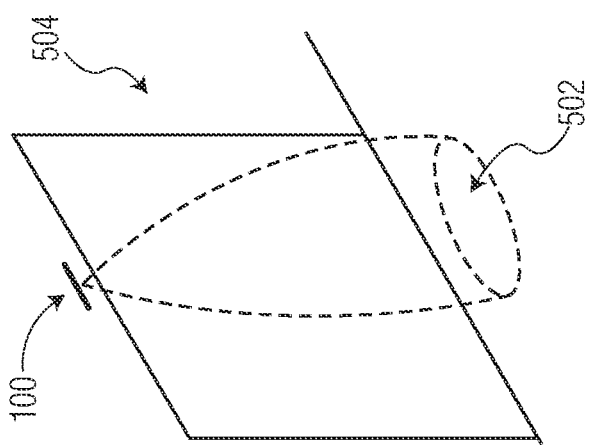
Figure 5I:
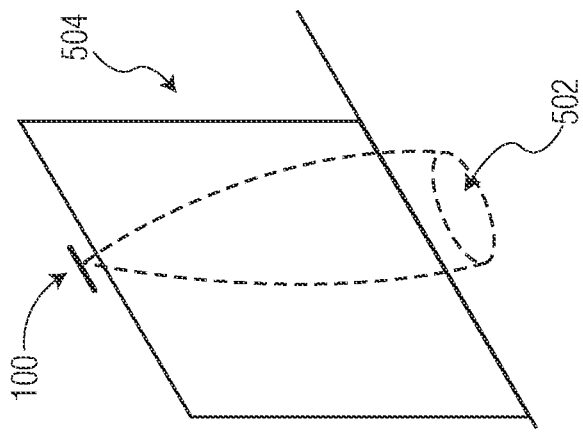

Referring now to FIG. 4, a diagram illustrating an IR pattern 400 formed by the IR sensor 106 is shown. FIG. 4 shows an overheard view of the IR pattern 400 on the surface. As shown, each of the emitters 0-47 is duplicated and projected onto areas of two independent receptors, thereby creating two independent signals for two areas. For example, the signal from emitter 0 is projected onto separate areas covered by the L0 receptor and the R0 receptor.

The arrangement of the receptors L0-R11 and emitters 0-47 are designed to provide, for example, three rows of IR sensitivity across the width of the IR pattern 400. Each of the rows may be an individual IR curtain. For example, the IR pattern 400 may include a first curtain 402, a second curtain 404, and a third curtain 406. It should be noted that any number of curtains may be generated. The multiple curtains provide depth to the detectable area of the IR sensor 106. Each of the first curtain 402, the second curtain 404, and the third curtain 406 may have 32 IR spots from the emitters 0-47.

Conventional IR sensors may not be able to control individual emitters. For example, field size may be adjusted by physical masking at least a portion of the conventional IR sensor. In contrast, each of the emitters 0-47 in the IR sensor 106 may be controlled individually. For example, the intensity of each of the IR spots from emitters 0-47 may be controlled and individual emitters of the emitters 0-47 may be activated and deactivated.

In an example, the activation and deactivation of the emitters 0-47 may be accomplished by actually turning individual emitters 0-47 on and off. When turned on, the individual emitters 0-47 may be configured to emit IR light. When turned off, the individual emitters 0-47 may be configured to not transmit the IR light.

In another example, the activation and deactivation of the emitters 0-47 may be a function of software stored in a memory and executed by the controller. The individual emitters 0-47 may all remain active. The controller may "activate" and "deactivate" one or more emitters 0-47 by disregarding/ignoring certain received signals in its processing. For example, the controller may "activate" emitter 0 by processing signals received from one or more receptors L0-R11 that are associated with emitter 0. The controller may "deactivate" emitter 0 by disregarding/ignoring signals received from one or more receptors L0-R11 that are associated with emitter 0.

Because the IR spots from emitters 0-47 may be individually controlled, the IR sensor 106 may know the location of the IR spots and may be able to analyze specific IR sports and their adjacent neighbors. This may allow the IR sensor 106 to perform safety detection not only by the intensity of single IR spot, but also by adjacent spots identified. Using this information the IR sensor 106 may be able to decide the object's size/width and its movement regardless of environmental factors (e.g., weather). Moreover, as described below, the design of the IR sensor 106 may allow for one or more of a manual and automatic shut down and/or disregard of individual IR spots (i.e., individual emitters 0-47). This may allow for different patterns of the IR pattern 400, including the deactivation of one or more of the first curtain 402, the second curtain 404, and the third curtain 406 to create different patterns.

Referring now to FIGS. 5A-5I, diagrams illustrating adjusting a width of a radar area 502 are shown. As shown in FIGS. 5A-5I, the door sensor 100 may be positioned above an opening 504. As described above, the main adjustment knob 112 may be used to adjust the radar area 502 emitted by the radar antenna 104. In an example, this may be done in conjunction with the screen 102. For example, a user may press in the main adjustment knob 112 one or more times to cycle through to a radar area 502 adjustment menu. Once at this menu, the user may rotate the main adjustment knob 112 to change a width of the radar area 502. In an example, there may be one or more presets for the radar area 502. For example, FIGS. 5A-5I may show settings 9 through 1, respectively. In another example, there may be no discrete settings for the radar area 502 and the user may continuously adjust the radar area 502 by twisting the main adjustment knob 112. The width of the radar area 502 may be adjusted to be greater than, equal to, or less than a width of the opening 504.

Referring now to FIGS. 6A-6D, diagrams illustrating adjusting a width and shape of the IR pattern 400 are shown. As shown in FIGS. 6A-6D, the door sensor 100 may be positioned above the opening 504.

FIGS. 6A-6D show each of the first curtain 402, the second curtain 404, and the third curtain 406 turned on. It should be noted that the first curtain 402, the second curtain 404, and the third curtain 406 and their corresponding IR dots shown are for illustrative purposes and are not actual visible to the human eye. In an example, the first curtain 402 may be on an opposite side of the opening 504 (i.e., threshold) than the second curtain 404 and the third curtain 406. FIGS. 6A-6D show each curtain activated, but as described in more detail below, the user may move and/or individually deactivate one or more of the first curtain 402, the second curtain 404, and the third curtain 406.

As described above, the main adjustment knob 112 may be used to adjust the width of the IR pattern 400. In an example, this may be done in conjunction with the screen 102. For example, a user may press in the main adjustment knob 112 one or more times to cycle through to an IR pattern 400 adjustment menu. Once at this menu, the user may rotate the main adjustment knob 112 to change the width of the IR pattern 400. In an example, there may be one or more presets for the width of the IR pattern 400. For example, FIGS. 6A-6D may show settings 1 through 4, respectively. In another example, there may be no discrete settings for the width of the IR pattern 400 and the user may continuously adjust the width of the IR pattern 400 by twisting the main adjustment knob 112. The width of the IR pattern 400 may be adjusted to be greater than, equal to, or less than a width of the opening 504.

Figure 6B:
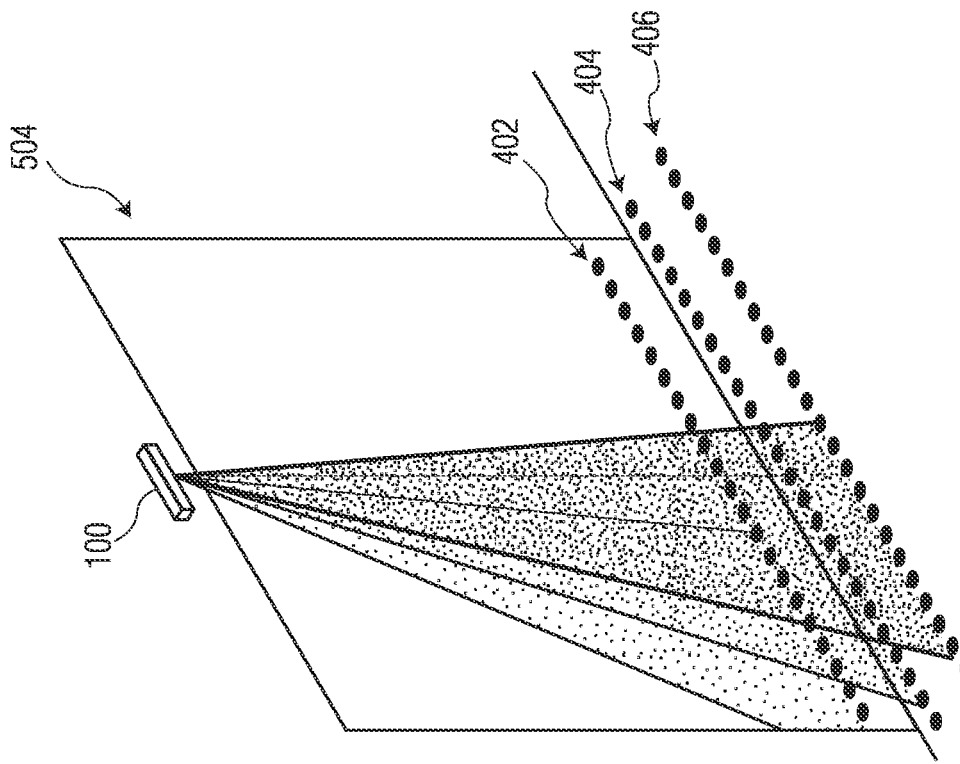
FIGS. 6A-6D are diagrams illustrating adjusting a width and shape of the IR pattern, according some embodiments of the present disclosure.
Figure 6A:
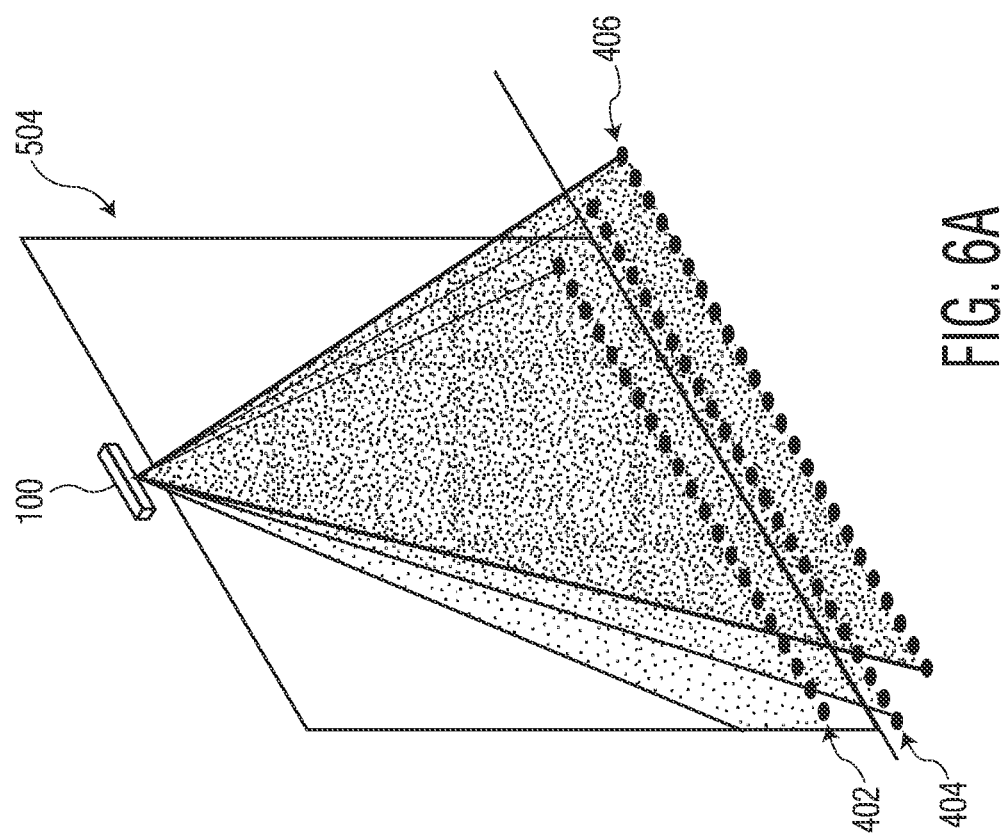

FIG. 6A shows the IR pattern 400 at a width greater than the width of the opening 504. This may be accomplished by activating and/or regarding all of the emitters 0-47 the receptors L0-R11.

FIG. 6B shows the IR pattern 400 at a width that is approximately one half the width of the opening 504. As shown in FIG. 6B, the IR pattern 400 may be directed to a left half of the opening 504. In an example, this may be accomplished by deactivating one or more of the emitters 0-47 and/or one or more of the receptors L0-R11. In another example, this may be accomplished by obstructing and/or deactivating one or more of the first lens 208, the second lens 210, the third lens 212, the fourth lens 214 and the first lens 308, the second lens 310, the third lens 312, and the fourth lens 314.

Figure 6D:
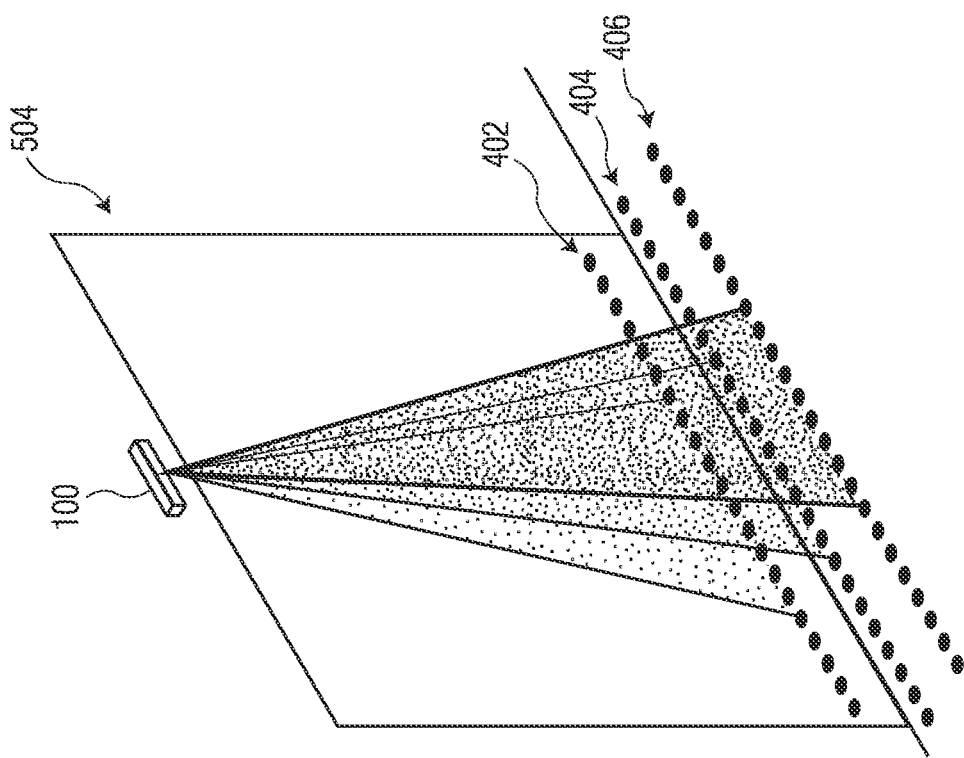
Figure 6C:
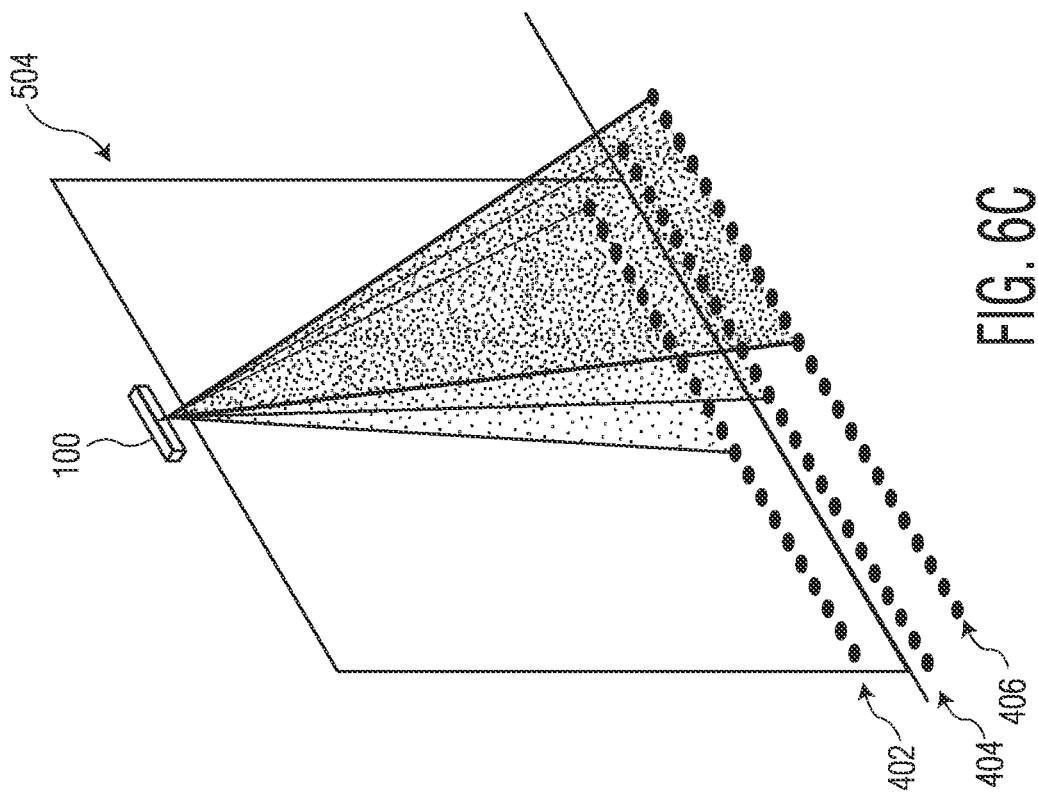

FIG. 6C shows the IR pattern 400 at a width that is approximately one half the width of the opening 504. As shown in FIG. 6C, the IR pattern 400 may be directed to a right half of the opening 504. In an example, this may be accomplished by deactivating one or more of the emitters 0-47 and/or one or more of the receptors L0-R11. In another example, this may be accomplished by obstructing and/or deactivating one or more of the first lens 208, the second lens 210, the third lens 212, the fourth lens 214 and the first lens 308, the second lens 310, the third lens 312, and the fourth lens 314.

FIG. 6D shows the IR pattern 400 at a width that is a portion of the width of the opening 504. As shown in FIG. 6D, the IR pattern 400 may be directed to a center portion of the opening 504. In an example, this may be accomplished by deactivating one or more of the emitters 0-47 and/or one or more of the receptors L0-R11. In another example, this may be accomplished by obstructing and/or deactivating one or more of the first lens 208, the second lens 210, the third lens 212, the fourth lens 214 and the first lens 308, the second lens 310, the third lens 312, and the fourth lens 314.

Figure 7A:
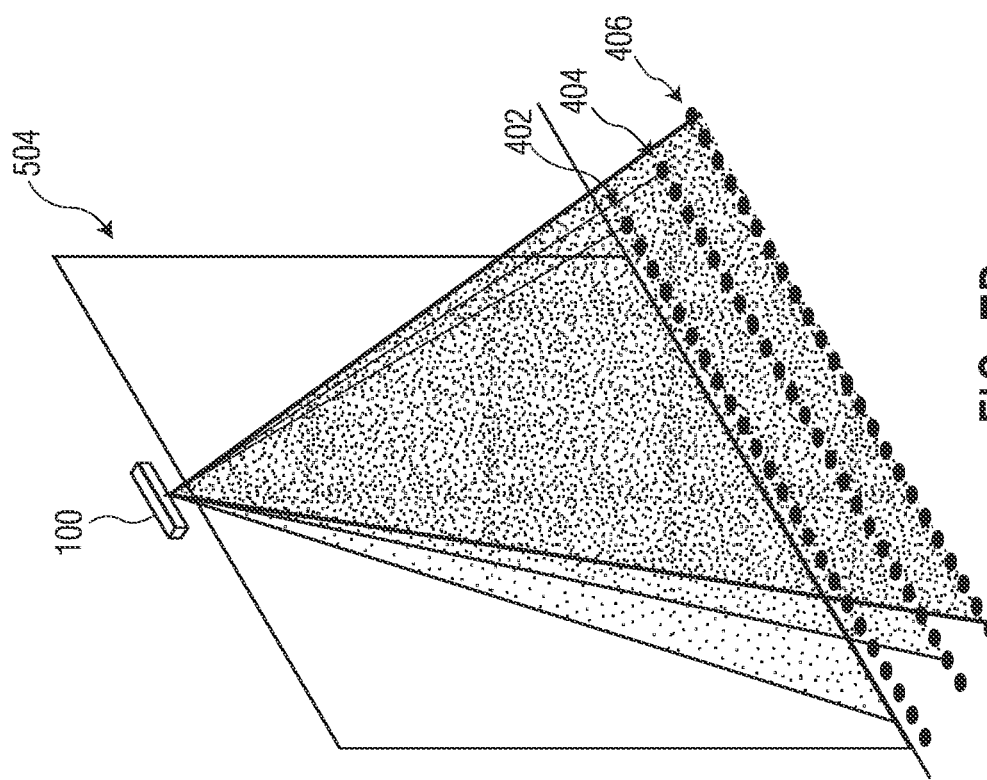
FIGS. 7A-7B are diagrams illustrating adjusting an angle of the IR pattern, according some embodiments of the present disclosure.
Figure 7B:
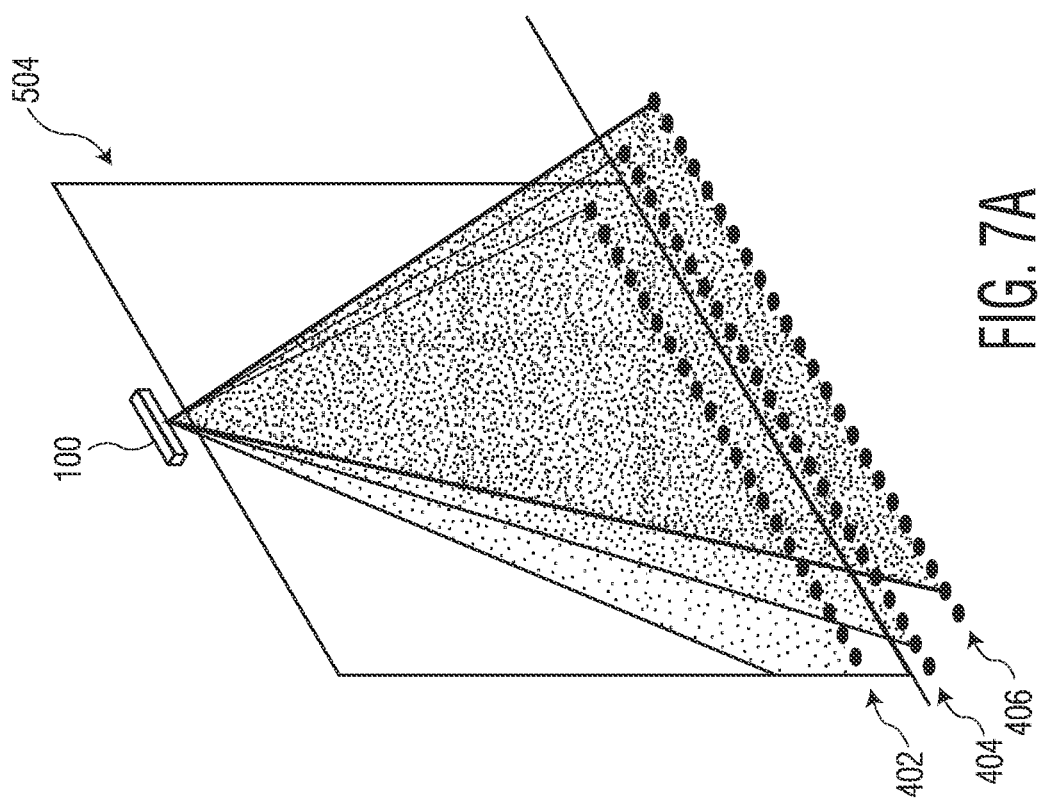

Referring now to FIGS. 7A-7B, diagrams illustrating adjusting an angle of the IR pattern 400 are shown. As shown in FIGS. 7A-7B, the door sensor 100 may be positioned above the opening 504.

FIGS. 7A-7B show each of the first curtain 402, the second curtain 404, and the third curtain 406 turned on. It should be noted that the first curtain 402, the second curtain 404, and the third curtain 406 and their corresponding IR dots shown are for illustrative purposes and are not actual visible to the human eye. FIGS. 7A-7B show each curtain activated, but as described in more detail below, the user may move and/or individually deactivate one or more of the first curtain 402, the second curtain 404, and the third curtain 406.

In an example, the angle adjustment knob 114 may be used to adjust the angle of the IR pattern 400. In an example, this may be done in conjunction with one or more of the screen 102 and the visible dots produced by the one or more LEDs. For example, a user may press in and/or rotate the angle adjustment knob 114 to change the angle of the IR pattern 400. In an example, there may be one or more presets for the angle of IR pattern 400. In another example, there may be no discrete settings for the angle of the IR pattern 400 and the user may continuously adjust the angle of the IR pattern 400 by twisting the angle adjustment knob 114.

In another example, the angle of the IR pattern 400 may be adjusted by shifting a position of one or more of the first lens 208, the second lens 210, the third lens 212, the fourth lens 214, the first lens 308, the second lens 310, the third lens 312, and the fourth lens 314 and may only involve the visible dots produced by the one or more LEDs.

FIG. 7A shows that the first curtain 402 may be on an opposite side of the opening 504 (i.e., threshold) than the second curtain 404 and the third curtain 406. FIG. 7B shows the first curtain 402 on the same side of the opening 504 (i.e., threshold) as the second curtain 404 and the third curtain 406, thereby extending out the area of the IR pattern 400 and removing detection on the opposite side of the opening 504.

In an example, this may be accomplished by changing the angle of one or more of the emitters 0-47 and/or one or more of the receptors L0-R11. In another example, this may be accomplished by shifting a position of one or more of the first lens 208, the second lens 210, the third lens 212, the fourth lens 214 and the first lens 308, the second lens 310, the third lens 312, and the fourth lens 314.

Figure 8B:
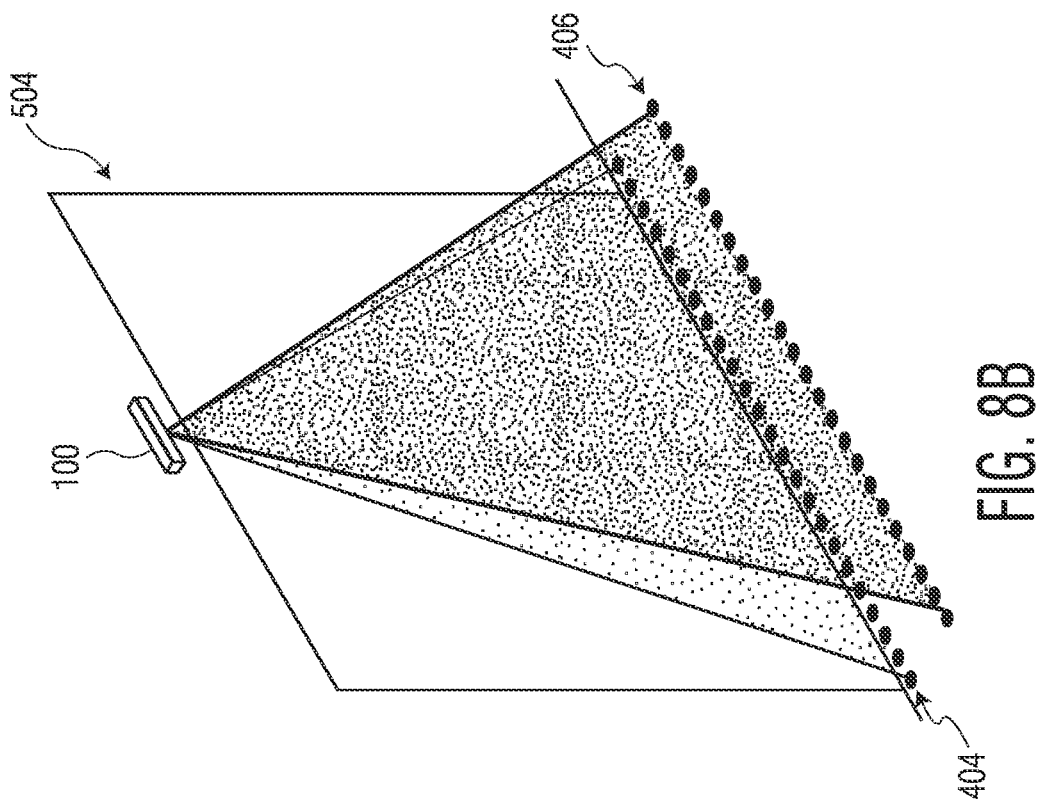
FIGS. 8A-8C are diagrams illustrating adjusting a number of curtains in the IR pattern, according some embodiments of the present disclosure.
Figure 8A:
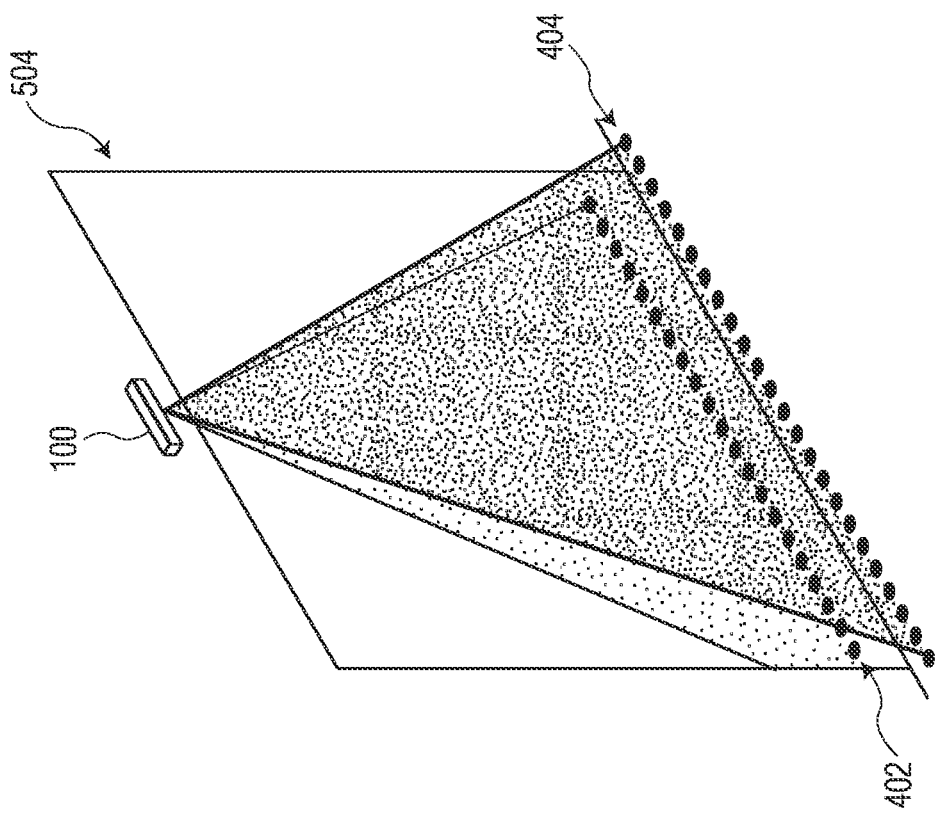
Figure 8C:
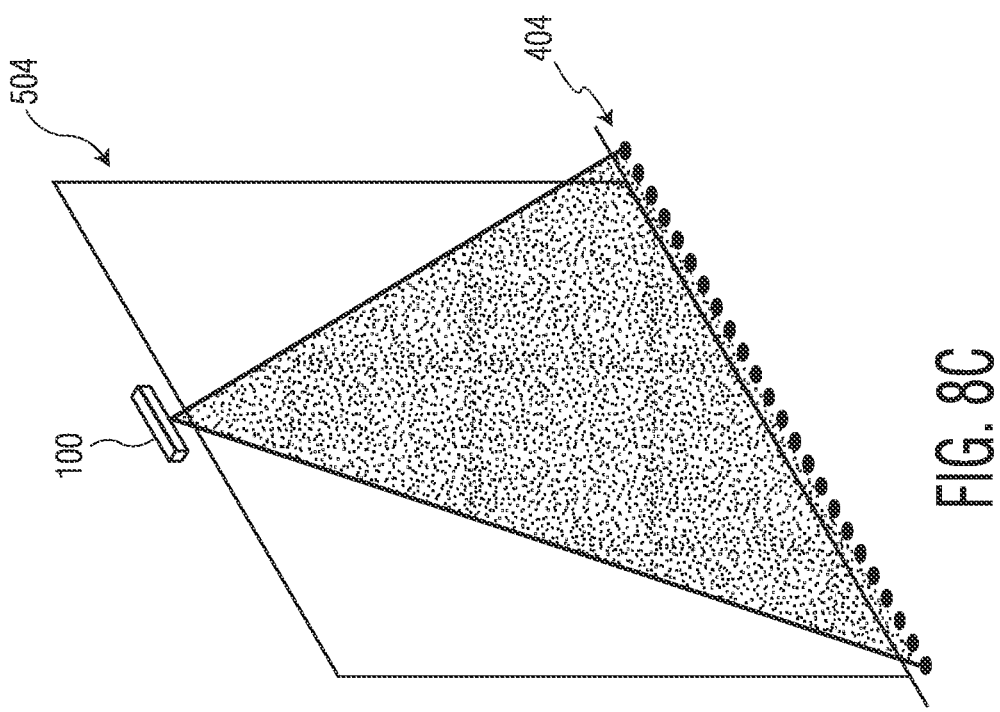

Referring now to FIGS. 8A-8C, diagrams illustrating adjusting a number of curtains in the IR pattern 400 are shown. As shown in FIGS. 8A-8C, the door sensor 100 may be positioned above the opening 504. It should be noted that the first curtain 402, the second curtain 404, and the third curtain 406 and their corresponding IR dots shown are for illustrative purposes and are not actual visible to the human eye.

FIGS. 8A-8C show one or more of the first curtain 402, the second curtain 404, and the third curtain 406 turned off. FIG. 8A shows the third curtain 406 deactivated and the first curtain 402 and second curtain activated. FIG. 8B shows the first curtain 402 deactivated and the second curtain 404 and the third curtain 406 activated FIG. 8C shows the first curtain 402 and the third curtain 406 deactivated and the second curtain 404 activated. Any combination of first curtain 402, second curtain 404, and third curtain 406 may be activated/deactivated.

As described above, the main adjustment knob 112 may be used to adjust the curtains of the IR pattern 400. In an example, this may be done in conjunction with the screen 102. For example, a user may press in the main adjustment knob 112 one or more times to cycle through to curtain adjustment menu. Once at this menu, the user may rotate the main adjustment knob 112 to change the number of curtains activated/deactivated. In an example, there may be one or more presets for the number of curtains.

In an example, this may be accomplished by deactivating one or more of the emitters 0-47 and/or one or more of the receptors L0-R11. In another example, this may be accomplished by obstructing and/or deactivating one or more of the first lens 208, the second lens 210, the third lens 212, the fourth lens 214 and the first lens 308, the second lens 310, the third lens 312, and the fourth lens 314.

Figure 9:
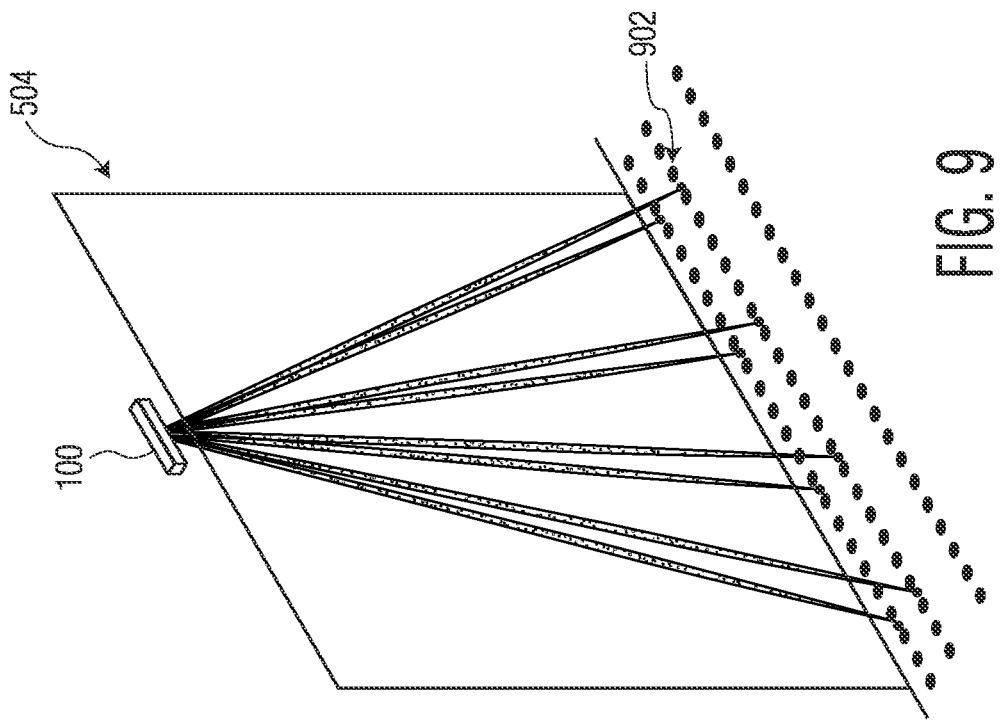
FIG. 9 is a diagram illustrating one or more visible spots for use in adjusting the IR pattern, according some embodiments of the present disclosure.

Referring now to FIGS. 9, a diagram illustrating one or more visible spots 902 for use in adjusting the IR pattern 400 is shown. As shown in FIG. 9, the door sensor 100 may be positioned above the opening 504. The one or more visible spots 902 may be projected by one or more LEDs in the door sensor 100. In an example, the one or more visible spots 902 may be activated whenever a user adjusts the IR pattern 400 via one or more of the main adjustment knob 112 and the angle adjustment knob 114.

Figure 10:
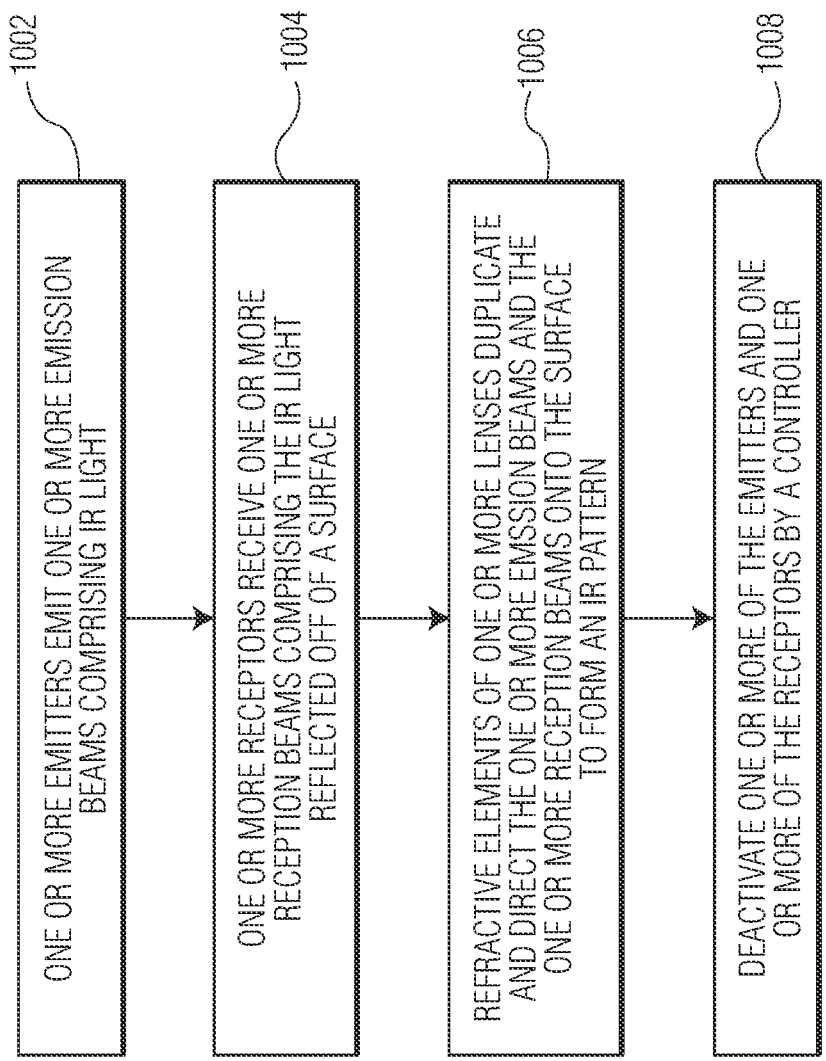
FIG. 10 is a flowchart illustrating a method for use in the door sensor.

Referring now to FIG. 10 a flowchart illustrating a method for use in the door sensor 100 is shown. In step 1002, one or more emitters may emit one or more emission beams comprising IR light. The one or more emitters may be arranged in multiple rows. In step 1004, one or more receptors may receive one or more reception beams comprising the IR light reflected off of a surface. The one or more receptors may be arranged in multiple rows. In step 1006, refractive elements of one or more lenses may duplicate and direct the one or more emission beams and the one or more reception beams onto the surface to form an IR pattern. The IR pattern may include multiple IR curtains. In step 1008, one or more of the emitters and one or more the receptors may be deactivated by a controller.

Figure 11:
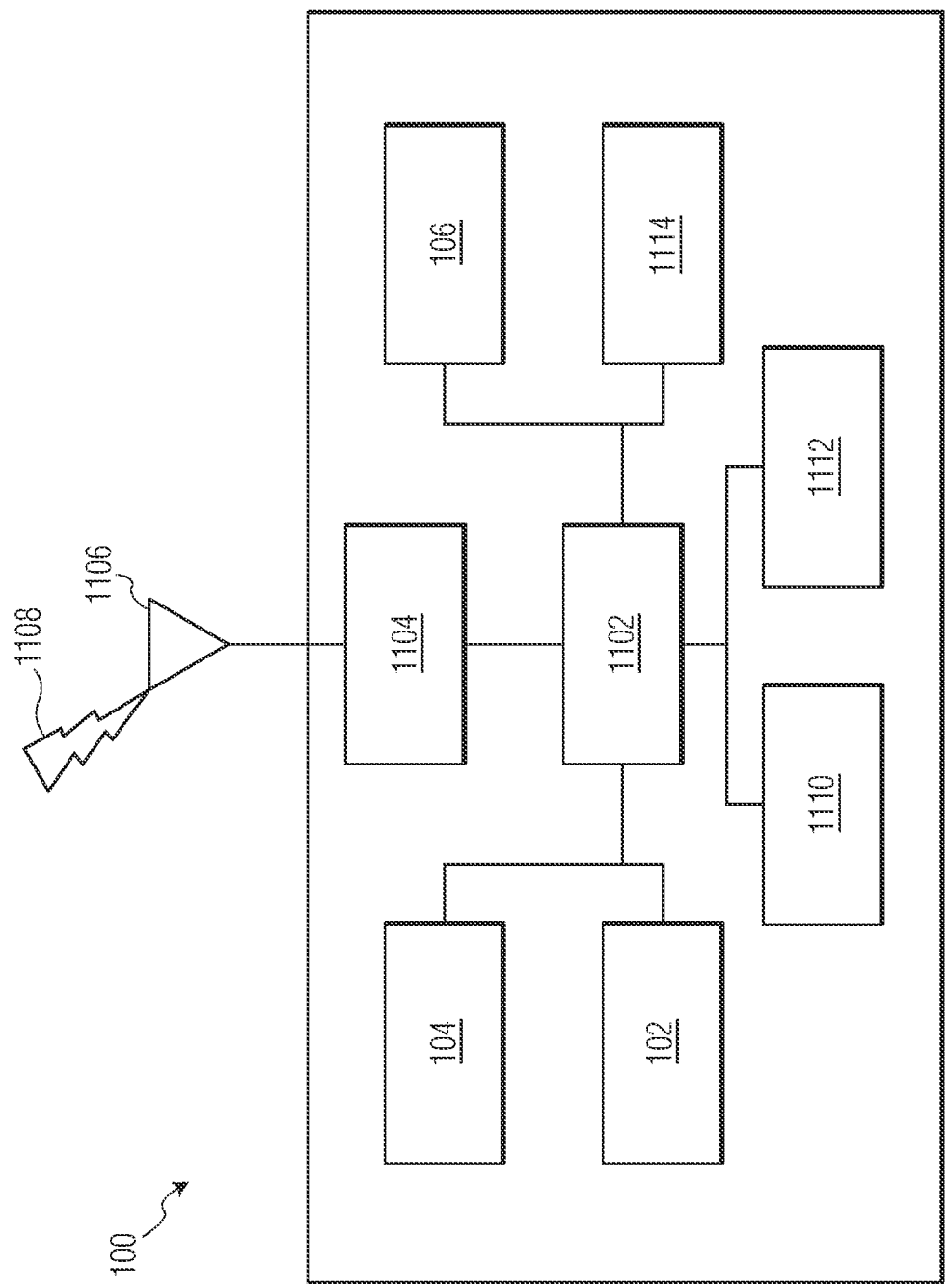
FIG. 11 is a schematic diagram illustrating example components of the door sensor.

Referring now to FIG. 11, a schematic diagram illustrating example components of the door sensor 100 is shown. The door sensor 100 may include one or more of the screen 102, the radar antenna 104, the IR sensor 106, a processor 1102, a transceiver 1104, a transmit/receive element 1106, air interface 1108, a non-removable memory 1110, a removable memory 1112, and a power source 1114 among others. It will be appreciated that the door sensor 100 may include any subcombination of the foregoing elements while remaining consistent with the disclosure.

The processor 1102 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 1102 may perform signal coding, data processing, power control, input/output processing, and/or any other functionality that enables the door sensor 100 to operate. The processor 1102 may be coupled to one or more of the IR sensor 106 and the transceiver 1104, which may be coupled to the transmit/receive element 1106. While FIG. 11 depicts the processor 1102 and the transceiver 1104 as separate components, it will be appreciated that the processor 1102 and the transceiver 1104 may be integrated together in an electronic package or chip.

The transmit/receive element 1106 may be configured to transmit/receive signals over the air interface 1108. The air interface 1108 may be any suitable wireless communication link (e.g., radio frequency (RF), microwave, centimeter wave, micrometer wave, infrared (IR), ultraviolet (UV), visible light, etc.). The air interface 1108 may be established using any suitable radio access technology (RAT). For example, the transmit/receive element 1106 may be an antenna configured to transmit and/or receive RF signals. The transmit/receive element 1106 may be an emitter/detector configured to transmit and/or receive IR, UV, or visible light signals, for example. The transmit/receive element 1106 may be configured to transmit and/or receive both RF and light signals. It will be appreciated that the transmit/receive element 1106 may be configured to transmit and/or receive any combination of wireless signals.

Although the transmit/receive element 1106 is depicted in FIG. 11 as a single element, the door sensor 100 may include any number of transmit/receive elements 1106. More specifically, the door sensor 100 may employ MIMO technology. Thus, the door sensor 100 may include two or more transmit/receive elements 1106 (e.g., multiple antennas) for transmitting and receiving wireless signals over the air interface 1108.

The transceiver 1104 may be configured to modulate the signals that are to be transmitted by the transmit/receive element 1106 and to demodulate the signals that are received by the transmit/receive element 1106. As noted above, the door sensor 100 may have multi-mode capabilities. Thus, the transceiver 1104 may include multiple transceivers for enabling the door sensor to communicate via multiple RATs, such as NR and IEEE 802.11, for example.

The processor 1102 may be coupled to, and may receive user input data from the other peripherals (e.g., the main adjustment knob 112 and the angle adjustment knob 114) The processor 1102 may also data to the screen 102. In addition, the processor 1102 may access information from, and store data in, any type of suitable memory, such as the non-removable memory 1110 and/or the removable memory 1112. The non-removable memory 1110 may include random-access memory (RAM), read-only memory (ROM), a hard disk, or any other type of memory storage device. The removable memory 1112 may include a subscriber identity module (SIM) card, a memory stick, a secure digital (SD) memory card, and the like. The processor 1102 may access information from, and store data in, memory that is not physically located on the door sensor 100, such as on a server or a home computer (not shown).

The processor 1102 may receive power from the power source 1114, and may be configured to distribute and/or control the power to the other components in the door sensor 100. The power source 1114 may be any suitable device for powering the door sensor. For example, the power source 1114 may include one or more dry cell batteries (e.g., nickel-cadmium (NiCd), nickel-zinc (NiZn), nickel metal hydride (NiMH), lithium-ion (Li-ion), etc.), solar cells, fuel cells, a wired connection and the like.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to software. It is understood that execution of the software may be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For the purposes of this disclosure a module is a software, hardware, or firmware (or combinations thereof) system, process or functionality, or component thereof, that performs or facilitates the processes, features, and/or functions described herein (with or without human interaction or augmentation). A module may include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing examples. In other words, functional elements being performed by single or multiple components, in various combinations of hardware and software or firmware, and individual functions, may be distributed among software applications at either the client level or server level or both. In this regard, any number of the features of the different examples described herein may be combined into single or multiple examples, and alternate examples having fewer than, or more than, all of the features described herein are possible.

Functionality may also be, in whole or in part, distributed among multiple components, in manners now known or to become known. Thus, a myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the examples of methods presented and described as flowcharts in this disclosure are provided by way of example in order to provide a more complete understanding of the technology. The disclosed methods are not limited to the operations and logical flow presented herein. Alternative examples are contemplated in which the order of the various operations is altered and in which sub-operations described as being part of a larger operation are performed independently.

While various examples have been described for purposes of this disclosure, such examples should not be deemed to limit the teaching of this disclosure to those examples. Various changes and modifications may be made to the elements and operations described above to obtain a result that remains within the scope of the systems and processes described in this disclosure.

What is claimed is:

1. An infrared (IR) sensor for use in a door sensor, the IR sensor comprising:
    a plurality of emitters arranged in multiple emitter rows, each emitter of the plurality of emitters configured to emit an emission beam comprising IR light;
    a plurality of receptors arranged in multiple receptor rows, each receptor of the plurality of receptors configured to receive a reception beam comprising the IR light reflected off of a surface, the multiple receptor rows comprising:
        a first row of receptors comprising first left receptors and first right receptors,
        a second row of receptors comprising second left receptors and second right receptors, and
        a third row of receptors comprising third left receptors and third right receptors; and
    one or more lenses, the one or more lenses comprising refractive elements configured to duplicate and direct one or more of the emission beams and one or more of the reception beams onto the surface to form an IR pattern, the IR pattern comprising multiple IR curtains.

2. The IR sensor of claim 1, wherein a number of the plurality of receptors is one half a number of the plurality of emitters.

3. The IR sensor of claim 1, wherein a total number of the plurality of receptors comprises 16-32 individual receptors.

4. The IR sensor of claim 1, wherein a total number of the plurality of emitters comprises 32-64 individual emitters.

5. The IR sensor of claim 1, wherein the one or more lenses are further configured to direct the emission beams of two emitters onto a reception beam of one receptor.

6. The IR sensor of claim 1, wherein the IR pattern comprises three rows, each row comprising 32 detection spots.

7. The IR sensor of claim 1, wherein the multiple emitter rows comprise:
    a first row of emitters comprising first left emitters and first right emitters;
    a second row of emitters comprising second left emitters and second right emitters; and
    a third row of emitters comprising third left emitters and third right emitters.

8. The IR sensor of claim 7, wherein the refractive elements of the one or more lenses are further configured to:
    direct the reception beams of the first left receptors, the second left receptors, and the third left receptors and the emission beams of the first left emitters, the second left emitters, and the third left emitters onto a first area of the surface;
    direct the reception beams of the first right receptors, the second right receptors, and the third right receptors and the emission beams of the first left emitters, the second left emitters, and the third left emitters onto a second area of the surface adjacent to the first area;
    direct the reception beams of the first left receptors, the second left receptors, and the third left receptors and the emission beams of the first right emitters, the second right emitters, and the third right emitters onto a third area of the surface adjacent to the second area; and
    direct the reception beams of the first right receptors, the second right receptors, and the third right receptors and the emission beams of the first right emitters, the second right emitters, and the third right emitters onto fourth area of the surface adjacent to the third area.

9. The IR sensor of claim 7, wherein:
    the receptor beams of the first left receptors and the first right receptors and the emitter beams of the first left emitters and the first right emitters form a first IR curtain;
    the receptor beams of the second left receptors and the second right receptors and the emitter beams of the second left emitters and the second right emitters form a second IR curtain; and
    the receptor beams of the third left receptors and the third right receptors and the emitter beams of the third left emitters and the third right emitters form a third IR curtain.

10. A method for use in an infrared (IR) sensor of a door sensor, the method comprising:
    emitting, by one or more emitters, one or more emission beams comprising IR light, the one or more emitters arranged in multiple emitter rows;
    receiving, by one or more receptors, one or more reception beams comprising the IR light reflected off of a surface, the one or more receptors arranged in multiple receptor rows comprising:
        a first row of receptors comprising first left receptors and first right receptors,
        a second row of receptors comprising second left receptors and second right receptors, and
        a third row of receptors comprising third left receptors and third right receptors; and
    duplicating and directing, by refractive elements of one or more lenses, the one or more emission beams and the one or more reception beams onto the surface to form an IR pattern, the IR pattern comprising multiple IR curtains.

11. The method of claim 10, further comprising:
    deactivating one or more of the one or more emitters and the one or more receptors to change one or more of a width of the IR pattern on the surface and a number of the IR curtains.

12. The method of claim 10, further comprising:
    adjusting one or more of the one or more receptors and the one or more emitters to change an angle of the IR pattern on the surface.

13. The method of claim 10, wherein the multiple IR curtains comprise a first IR curtain on a first side of threshold below the door sensor and a second IR curtain and a third IR curtain on a second side of the threshold.

14. The method of claim 10, wherein the multiple IR curtains comprise a first IR curtain, a second IR curtain, and a third IR curtain are on a first side of an opening below the door sensor.

15. The method of claim 10, wherein a number of the one or more receptors is one half a number of the one or more emitters.

16. The method of claim 10, wherein a total number of the one or more receptors comprises 24.

17. The method of claim 10, wherein a total number of the one or more emitters comprises 48.

18. The method of claim 10, further comprising:
directing, by the refractive elements of the one or more lenses, the emission beams of two emitters onto a reception beam of one receptor.

19. The method of claim 10, wherein the IR pattern comprises three rows, each row comprising 32 detection spots.

20. The method of claim 10, wherein the multiple emitter rows comprise:
a first row of emitters comprising first left emitters and first right emitters;
a second row of emitters comprising second left emitters and second right emitters; and
a third row of emitters comprising third left emitters and third right emitters.

* * * * *